United States Patent
Jongert et al.

(10) Patent No.: US 10,787,621 B2
(45) Date of Patent: Sep. 29, 2020

(54) LUBRICANT COMPOSITION AND USES THEREOF

(71) Applicants: VDV LUBRICANTS, Baasrode (BE); Erik Jongert, Lennik (BE)

(72) Inventors: Dirk Jongert, Asse (BE); François Breye, Opwijk (BE)

(73) Assignee: FUCHS LUBRICANTS (UK) PLC, Staffordshire (GB)

( * ) Notice: Subject to any disclaimer, the term of this patent is extended or adjusted under 35 U.S.C. 154(b) by 72 days.

(21) Appl. No.: 16/072,933

(22) PCT Filed: Jan. 27, 2017

(86) PCT No.: PCT/EP2017/051825
§ 371 (c)(1),
(2) Date: Jul. 26, 2018

(87) PCT Pub. No.: WO2017/129778
PCT Pub. Date: Aug. 3, 2017

(65) Prior Publication Data
US 2019/0010415 A1    Jan. 10, 2019

(30) Foreign Application Priority Data
Jan. 29, 2016 (BE) .................................. 2016/5077

(51) Int. Cl.
*C03B 40/02* (2006.01)
*C10M 107/06* (2006.01)
*C10M 169/04* (2006.01)

(52) U.S. Cl.
CPC ........... *C10M 107/06* (2013.01); *C03B 40/02* (2013.01); *C10M 169/04* (2013.01); *C10M 169/044* (2013.01); *C10M 2201/041* (2013.01); *C10M 2205/0245* (2013.01); *C10M 2205/0265* (2013.01); *C10M 2219/022* (2013.01); *C10M 2219/024* (2013.01); *C10M 2229/041* (2013.01); *C10N 2220/082* (2013.01); *C10N 2240/58* (2013.01)

(58) Field of Classification Search
CPC ....................................................... C03B 40/02
See application file for complete search history.

(56) References Cited

U.S. PATENT DOCUMENTS

| | | | |
|---|---|---|---|
| 2,932,576 A | 4/1960 | Vierk et al. | |
| 3,242,075 A | 3/1966 | Hunter | |
| 3,806,453 A | 4/1974 | McDole | |
| 4,119,547 A | 10/1978 | Nachtman et al. | |
| 5,190,682 A | 3/1993 | Harris | |
| 5,865,884 A * | 2/1999 | Segawa | C03B 40/02 106/243 |
| 2014/0260428 A1 * | 9/2014 | Diehm | C03B 40/02 65/24 |
| 2017/0233284 A1 * | 8/2017 | Diehm | C03B 40/02 65/26 |

FOREIGN PATENT DOCUMENTS

| | | |
|---|---|---|
| WO | 2007/108982 | 9/2007 |
| WO | 2007138226 | 12/2007 |

* cited by examiner

*Primary Examiner* — Ellen M McAvoy
(74) *Attorney, Agent, or Firm* — Duane Morris LLP; Gregory M. Lefkowitz

(57) ABSTRACT

A lubricant composition comprising one or several poly-alpha olefin homopolymer(s), a suspension of particles having a size between 0.5 μm and 25 μm and an additive, and uses thereof in the glass industry, such as in the production of hollow glasses for the packaging of products to be applied on mammals.

15 Claims, No Drawings

LUBRICANT COMPOSITION AND USES THEREOF

CROSS-REFERENCE TO RELATED APPLICATIONS

This application is a § 371 national stage entry of International Application No. PCT/EP2017/051825, filed Jan. 27, 2017, which claims priority to Belgian Patent Application No. 2016/5077, filed Jan. 29, 2016, the entire contents of which are incorporated herein by reference.

FIELD OF THE INVENTION

The present invention relates to new lubricant compositions that are based on synthetic oils, such as on poly-alpha olefins, being for use in the glass industry.

STATE OF THE ART

The industry of hollow glass encompasses the use of one or of several molds.

Usually a hollow glass is firstly formed in a blank mold at high temperatures (e.g. above 400° C.), followed by a finishing process in a finishing mold, again at a high temperature.

Lubricant formulations are usually applied to the walls of the molds so as to grease them. WO2007/138226 describes an automatic greasing of molds for forming of hollow glass products. Typical lubricant compositions comprise a liquid (oil) component, one or several additives and particles, such as graphite particles in suspension.

Refined mineral oil fractions are selected for cost considerations to make the bulk of the prior art lubricant compositions, and they allow lubricant formulations with good properties that are further adapted and improved by the other additives.

U.S. Pat. No. 3,806,453 discloses a lubricant for metal working, which contains a major portion of a viscous not-defined polybutene, a solid lubricant and a dispersing agent; this composition is to be diluted with kerosene or similar liquids before use.

Similarly, U.S. Pat. No. 5,190,682 discloses lubricant mixtures for use as base fluid comprising a very viscous not-defined polybutene and a much less viscous poly alpha olefin.

However, none of the prior art documents disclose to essentially base a lubricant composition on homopolymer of poly alpha olefin.

SUMMARY OF THE INVENTION

The present invention is related to a lubricant composition where, instead of a mineral oil fraction, one synthetic oil (or less preferably a mixture of synthetic oils) is (are) chosen to form the oil (liquid) component. The synthetic oil is an homopolymer of an alpha-olefin or a mixture of homopolymers of alpha-olefins.

Since high temperatures are involved, carbon residues, including polycyclic aromatic hydrocarbons, are produced in the processing of hollow glass using the prior art formulations as greasing material. One advantage of the incorporation of the synthetic oil of the present invention into a lubricant composition is a marked reduction of carbon residues (such as solid carbon residues or polycyclic aromatic hydrocarbons) adsorbed to the glass or to the mold(s), and present in the heat-generated vapor surrounding the mold(s). Another advantage is the possibility to incorporate less particulate materials such as graphite, carbon black or molydbenum disulfide in the lubricant composition, but to keep excellent lubricant properties.

The synthetic oil of the lubricant composition of the present invention (forming the liquid/oil component of the lubricant composition) is (comprises, consists essentially of, or consists of) an homopolymer of an alpha olefin, such as poly isobutene (or 2-methyl-1 propene).

The lubricant composition further comprises, in addition to the oil component (synthetic oil), at least one additive and/or particles (of graphite) in suspension. The at least one additive preferably act(s) as anti-oxidant and/or as dispersion agent and/or as a viscosity (increasing) agent (thickener).

The lubricant composition of the present invention advantageously comprises at least 50 wt % of the synthetic oil (an homopolymer of an alpha olefin, such as poly isobutene (or 2-methyl-1 propene)).

A first aspect of the present invention is a synthetic oil-based lubricant composition comprising one or several poly-alpha olefin homopolymer(s) (such as poly isobutene) in an amount of at least 50 wt % of the said composition (total weight of all the poly-alpha olefin homopolymers:total weight of the composition), (graphite) particles (in suspension) having a size between 0.5 μm and 25 μm, such as graphite particles, and an additive (one or several additive(s)). Preferably, the poly alpha-olefin homopolymer(s) represent(s) at least 50 wt % and less than 80 wt % of the lubricant composition and/or the (graphite) particles represent at least 1 wt % of the lubricant composition (possibly up to 5 wt %), the additive(s) representing the remaining part of the lubricant composition to reach 100 wt %. This lubricant composition is especially adapted for the production of hollow (packaging) glass.

Alternatively, a concentrated lubricant compositions of the invention comprises
at least 10 wt % of one or several poly-alpha olefin homopolymer(s) (such as poly isobutene) and
at least 50 wt % of (i) at least one additive (selected from the group consisting of a sulfur-containing $C_4$-$C_{22}$ fatty acid ester of a $C_1$-$C_8$ alcohol, polydimethylsiloxane, a sulphur-containing $C_8$-$C_{18}$ alcene, a viscosity (increasing) agent and mixtures thereof) and of (ii) of particles (of graphite) in suspension having a size between 0.5 μm and 25 μm. This concentrated lubricant composition is to be diluted (at least more than two fold) with a poly alpha olefin (e.g. with poly isobutene) before use.

Another object of the present invention is a process for the production of hollow (packaging) glass comprising the steps of:
- applying a glass gob at a temperature between 400° C.-550° C. in a blank mold and obtaining a blank;
- applying the blank at a temperature between 400° C.-550° C. in a finishing mold;
- obtaining the finished hollow glass, wherein a lubricant composition based on a synthetic oil (comprising at least 50 wt % of the synthetic oil (an homopolymer of an alpha olefin, such as poly isobutene (or 2-methyl-1 propene))) has been (previously) applied either to the blank mold, or to the finishing mold or to the two molds. Preferably the composition of the invention has been applied (at least) to the blank mold.

Another related object of the present invention is the hollow glass obtainable by this process.

Still another object of the present invention is the use of the obtained glass for the packaging of products to be put in contact with mammals, preferably for the packaging of perfumes, cosmetics, food products or of pharmaceutical compositions.

Conversely, the present invention is a process for the production of glass for the packaging of perfumes, cosmetics, food products or of pharmaceutical compositions comprising the steps of:
  applying a glass gob at a temperature between 400° C.-550° C. in a blank mold and obtaining a blank;
  applying the blank at a temperature between 400° C.-550° C. in a finishing mold;
  obtaining the finished hollow glass;
  filling the said hollow glass with the packaging, wherein the lubricant composition of the present invention based on a synthetic oil (comprising at least 50 wt % of the synthetic oil (an homopolymer of an alpha olefin, such as poly isobutene (or 2-methyl-1 propene))) has been (previously) applied either to the blank mold, or to the finishing mold or to the two molds.

DETAILED DESCRIPTION OF THE INVENTION

The inventors have chosen to avoid refined mineral oil and to focus on synthetic oils despite the increased costs of the latter.

The inventors have obtained very good results with an oil component made with (consisting (essentially) of) an homopolymer of isobutene (a polymer made of 2-methyl-1-propene).

Therefore, a first aspect of the present invention is a lubricant composition comprising
at least 40 wt % of a synthetic oil, wherein the synthetic oil is one or several poly-alpha olefin homopolymer(s),
(graphite) particles (in suspension) having a size between 0.5 µm and 25 µm and
an additive (e.g. anti-oxidant and/or dispersion agent and/or a viscosity increasing agent).

Advantageously, the synthetic oil represents at least 40 wt %, preferably at least (about) 50 wt % or at least (about) 55 wt % of the composition and less than 90 wt %, preferably less than 80 wt %, more preferably less than (about) 75 wt % or less than (about) 70 wt % or even less than (about) 65 wt % (e.g. between 50 wt % and 70 wt %), and/or the (graphite) particles represent at least 1 wt % and/or up to 5 wt % (wt particle:wt lubricant composition).

The (graphite) particles are advantageously added to the lubricant composition in the form of a suspension (wherein the liquid component of the suspension is compatible with the other compounds and with the lubricant properties of the lubricant composition of the present invention).

Thus, the liquid component of the suspension of (graphite) particles is a non-aqueous liquid, possibly a (refined) mineral oil, preferably a synthetic oil (poly alpha olefin, such as poly isobutene). When the liquid component of the suspension is a poly alpha olefin, the amount of the poly alpha olefin incorporated together with the (graphite) particles suspension is counted with the amount of the (bulk) poly alpha olefin of the composition. Conversely, when the liquid component of the suspension is another (mineral) oil, this amount is considered as an additive (even if deprived of anti-oxidant and/or of dispersion and/or of thickening properties (thickener)).

Preferably, the alpha olefin homopolymer is made of monomers that are mono-unsaturated alcenes, most preferably the monomers are butene such as isobutene (2-methyl-1-propene).

Preferably, the synthetic oil of the lubricant composition consists essentially of (consists of) one homopolymer of one mono-unsaturated alcene, such as poly-iso-butene (CAS 9044-17-1).

Preferably, the alpha olefin homopolymer, such as the poly-isobutene, has a viscosity at 40° C. between 5 and 2000 cSt, more preferably between 10 and 500 cSt, still more preferably between 20 and 140 cSt. For instance, an alpha olefin homopolymer, such as the poly-isobutene may have a viscosity at 40° C. between 5 (or 10) and 500 cSt.

Preferably, the alpha olefin homopolymer, such as the poly-isobutene, has a viscosity at 100° C. between 5 and 3000 cSt, more preferably between 20 and 1500 cSt, still more preferably between 40 and 500 cSt, still more preferably between 50 and 150 cSt. A suitable viscosity ranges between 5 and 500 cSt (100° C.)

The viscosity of the alpha olefin polymers can be measured by the ASTM D 445 method (at 40° C. or at 100° C.)

A suitable homopolymer of an alpha olefin is an homopolymer (ex. of isobutene (or 2-methyl-1 propene)) of between (about) 200 and (about) 1300 Dalton, preferably between (about) 450 and (about) 800 Dalton. In this context, the word 'about' refers to a variation (plus or minus) of 10%, preferably to a variation of 5% around the above-values, thus 'about 200' means, in that context any integer between 180 and 220, preferably any integer between 190 and 210. The molecular weight can be measured by Gel Permeation Chromatography (GPC).

The preferred additives are selected from the group consisting of a sulfur-containing $C_4$-$C_{22}$ fatty acid ester of a $C_1$-$C_8$ alcohol (preferably a $C_{12}$-$C_{22}$ fatty acid ester of methanol), polydimethylsiloxane, a sulphur-containing $C_8$-$C_{18}$ alcene, a viscosity (increasing) agent (thickener) and mixtures thereof (either one of the three compounds, any mixture of two compounds from the list or all the three compounds).

When the sulphur-containing $C_4$-$C_{22}$ fatty acid ester of a $C_1$-$C_8$ alcohol is present, it is preferably added in an amount between 10 and 16 wt %. When polydimethylsiloxane is added, it is preferably added in an amount between 1 and 10 wt %, and when the sulfur-containing $C_8$-$C_{18}$ alcene is added, it is preferably added in an amount between 5 and 12 wt %.

The total amount of the additives usually ranges between (about) 15 wt % and (about) 45 wt %, for instance between (about) 20 wt % and (about) 30 wt %. A preferred viscosity (increasing) agents is one or several thickener(s) such as mineral grease (e.g. a Calcium grease).

Preferably the viscosity (increasing) agent (thickener) is chosen and added in a concentration such that the properties of the composition are kept and so as to impart to the lubricant composition a viscosity between 1000 and 10000 cPs (25° C.) (i.e. 1 to 10 Pa·s; 25° C.), preferably a viscosity between 4000 and 8000 cPs (25° C.), more preferably between (about) 4500 and (about) 5000 cPs (25° C.)

By "about", it is preferably meant plus or minus 10% and all the intermediate values (e.g. "about 100" means any value from 90 to 110).

It should be noted that, although the additives of the present invention might be liquid or based on long hydrocarbons, in the present invention they are not to be understood to be part of the synthetic oil component, and the definition of the composition of the synthetic oil component excludes these additives, as focused on homopolymers of mono-unsaturated alcenes; conversely, the percentages (e.g. 50 wt %-70 wt %) imparted in the present invention to the synthetic oil component should not encompass the sum of the additives in addition to the amount of homopolymers of the synthetic oil (mono-unsaturated alcenes or poly-alpha olefin(s)).

A related aspect of the present invention is a process for the production of hollow glass comprising the steps of:
greasing at least one mold with the lubricant composition of the present invention, charging the glass parison into the at least greased one mold (e.g. a blank mold and/or a finishing mold, preferably the blank mold is greased) and obtaining the hollow glass.

For instance, the process involves a greased blank mold with the lubricant composition of the invention and a finishing mold (ungreased, greased with a lubricant composition of the prior art, or greased with the lubricant composition of the present invention). The charging of the parison into the blank mold may be carried out by gravity. Then a punch performs a movement driving the parison with it. Thereafter the blank mold is open and the blank is transferred into the finishing mold. The finished product is obtained by stretching of the blank into its own weight, inflating of the stretched blank, and extracting of the hollow glass.

Another related aspect of the present invention is the hollow glass obtainable (the glass obtained) by this process. For instance this glass comprises low traces of carbon residues.

Conversely, this hollow glass (obtainable or obtained by this process) is used for packaging compositions to be applied to mammals, such as pharmaceutical compositions, cosmetic compositions, food compositions or products and perfumes.

EXAMPLE

The inventors have compared a lubricant composition as in the prior art (U.S. Pat. No. 5,190,682), comprising about 5% of additives; 46.7% of generic polybutene (not an homopolymer of isobutene) and on less viscous poly alpha olefin and 13% of particulate components (graphite, Molybdenum disulfide and carbon black) with a composition according to the present invention comprising essentially poly isobutene. The inventors have noticed that similar lubricant properties have been achieved even when reducing the load of particulate component (3% of graphite performed almost similarly as in the example of the prior art). Moreover, it was easier to control, thus to adapt if needed, the physical properties of the composition, such as the viscosity at 40° C. while keeping excellent lubricant properties at high temperatures.

The invention claimed is:

1. A synthetic oil-based lubricant composition for greasing of a mold in the production of a hollow glass, the lubricant composition consisting of:
   at least 50 wt % of a poly-alpha olefin homopolymer,
   a suspension of particles having a size between 0.5 μm and 25 μm, and
   an additive selected from the group consisting of a sulfur-containing $C_4$-$C_{22}$ fatty acid ester of a $C_1$-$C_8$ alcohol, polydimethylsiloxane, a sulfur-containing $C_8$-$C_{18}$ alkene, a thickener, and mixtures thereof,
   wherein the thickener imparts a viscosity (25° C.) of between 1000 and 10000 cPs to the lubricant composition.

2. The lubricant composition of claim 1, wherein the poly-alpha olefin homopolymer has a viscosity at 40° C. comprised between 5 and 500 cSt.

3. The lubricant composition of claim 1, wherein the homopolymer represent(s) at least 50 wt % of the said composition and less than 80 wt %.

4. The lubricant composition according to claim 1, wherein the particles represent at least 1 wt % of the said lubricant composition.

5. The lubricant composition according to claim 1, wherein the particles are added in the form of a suspension in a mineral oil or a poly-alpha olefin.

6. The lubricant composition of claim 4, wherein the additive(s) represent(s) the remaining part of the lubricant composition, and
   wherein the said additives are anti-oxidant and/or dispersion agents and/or thickener.

7. The lubricant composition of claim 5, wherein the additive(s) represent(s) the remaining part of the lubricant composition, and
   wherein the said additives are anti-oxidant and/or dispersion agents and/or thickener, and the mineral oil or the poly-alpha olefin being the suspending medium of the particles.

8. The lubricant composition according to claim 1, wherein the homopolymer comprise or consists of polymer of 2-methyl-1 propene.

9. The lubricant composition of claim 1, wherein the additive comprises the thickener, and
   the sulfur-containing $C_4$-$C_{22}$ fatty acid ester of a $C_1$-$C_8$ alcohol and polydimethylsiloxane, or
   the sulphur-containing $C_4$-$C_{22}$ fatty acid ester of a $C_1$-$C_8$ alcohol and the sulfur-containing $C_8$-$C_{18}$ alkene, or
   polydimethylsiloxane and the sulfur-containing $C_8$-$C_{18}$ alkene.

10. The lubricant composition of claim 1, wherein the sulfur-containing $C_4$-$C_{22}$ fatty acid ester of a $C_1$-$C_8$ alcohol is a $C_{12}$-$C_{22}$ fatty acid ester of methanol.

11. The lubricant composition according to claim 1, comprising between 10 and 16 wt % of the sulfur-containing $C_4$-$C_{22}$ fatty acid ester of a $C_1$-$C_8$ alcohol and/or between 1 and 10 wt % of polydimethylsiloxane and/or between 5 and 12 wt % of the sulphur-containing $C_8$-$C_{18}$ alkene.

12. A process for the production of a hollow glass comprising the steps of:
    greasing at least one mold with the lubricant composition according to claim 1;
    applying a parison at a temperature between 400° C.-550° C. in the at least one mold; and
    obtaining the finished hollow glass.

13. The process of claim 12 comprising:
    the step of applying a parison at a temperature between 400° C.-550° C. in a blank mold and
    the step of applying the parison obtained from the said blank mold at a temperature between 400° C.-550° C. in a finishing mold,
    wherein the lubricant composition according of at least 50 wt % of one or several poly-alpha olefin homopolymer, and a suspension of particles having a size between 0.5 μm and 25 μm and an additive, is pre-applied either in the greasing of the blank mold or in the greasing of the finishing mold, or in the greasing of both the blank mold and the finishing mold.

14. The hollow glass obtainable by the process of claim 13.

15. A method for the packaging of perfumes, cosmetics, food products or of pharmaceutical compositions comprising the steps of:
    applying a glass gob at a temperature between 400° C.-550° C. in a blank mold and obtaining a blank;

applying the blank at a temperature between 400° C.-550°
C. in a finishing mold;
obtaining a finished hollow glass; and
filling the said hollow glass with the packaging,
wherein a lubricant composition comprising at least 50 wt
% of a homopolymer of an alpha olefin has been
previously applied to the blank mold, the finishing
mold, or both.

* * * * *